(12) United States Patent
Ohtani et al.

(10) Patent No.: US 6,289,050 B1
(45) Date of Patent: Sep. 11, 2001

(54) DEVICE AND METHOD FOR MOTION VECTOR DETECTION

(75) Inventors: Akihiko Ohtani, Osaka; Katsuji Aoki, Kanagawa; Toshiyuki Araki, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/129,534

(22) Filed: Aug. 5, 1998

(30) Foreign Application Priority Data

Aug. 7, 1997 (JP) .................................................. 9-212826

(51) Int. Cl.$^7$ ...................................................... H04N 7/12
(52) U.S. Cl. ............................................................ 375/240.16
(58) Field of Search .................................... 348/415, 416, 348/413, 699, 714, 715

(56) References Cited

U.S. PATENT DOCUMENTS

| | | | |
|---|---|---|---|
| 5,400,087 | * 3/1995 | Uramoto et al. ........................ | 348/699 |
| 5,477,278 | * 12/1995 | Kitaura et al. ......................... | 348/699 |
| 5,793,443 | * 8/1998 | Aoki et al. ............................ | 348/699 |

FOREIGN PATENT DOCUMENTS

| | | |
|---|---|---|
| 0652678 | 10/1994 | (EP) . |
| 0652678 | 5/1995 | (EP) . |
| 0689359 | 6/1995 | (EP) . |
| 0689359 | 12/1995 | (EP) . |
| 2265516 | 9/1993 | (GB) . |
| 05328333 | 12/1993 | (JP) . |
| 07050841 | 2/1995 | (JP) . |
| 07143492 | 6/1995 | (JP) . |
| 08032969 | 2/1996 | (JP) . |
| 08237660 | 9/1996 | (JP) . |
| 08340538 | 12/1996 | (JP) . |

OTHER PUBLICATIONS

Hartwig S, et al: "Digitale Bildcodierung, Teil 6, Bewgungskompensierte Interframe—DPCM" Fernseh Und Kiontechnik, vol. 46, No. 5, Jan. 1, 1992, pp. 416–421, 424.

Hildebrand K, et al: "Motion Estimation in the Hermes Videocodec" Frequenz, vol. 47, No. 11/12, Nov. 1, 1993, pp. 303–309.

Liang–Wei Lee, et al.: "Dynamic Search–Window Adjustment and Interlaced Search for Block–Matching Algorithm" IEEE Transactions on circuit and Systems fo Video Technology, vol. 3, No. 1, Feb. 1993, pp. 85–87.

* cited by examiner

Primary Examiner—Chris Kelley
Assistant Examiner—Allen Wong
(74) Attorney, Agent, or Firm—McDermott, Will & Emery

(57) ABSTRACT

According to the invention, a motion vector can be accurately and efficiently detected with regard to any type of images having a variety of characteristics. A motion vector detection unit detects a motion vector with regard to a coding target block on the basis of correlation with a candidate block within a search range. A search range storing memory stores pixel data of an original search range, and supplies, to the motion vector detection unit, pixel data of a search range in accordance with a memory address. A control unit sets the size and the position of the search range on the basis of the motion vector and the correlation evaluation value supplied from the motion vector detection unit, and generates pixel widths in the horizontal and vertical directions of the search range and an offset value corresponding to the relative position to the original search range. An address generation unit generates the memory address to be supplied to the search range storing memory on the basis of the pixel widths and the offset value of the search range generated by the control unit.

7 Claims, 16 Drawing Sheets

Search range W

Search range S

Search range S

DEVICE AND METHOD FOR MOTION VECTOR DETECTION

BACKGROUND OF THE INVENTION

The present invention relates to motion vector detection used in motion compensative prediction coding, that is, a technique of compression coding of digital dynamic image data.

As a method of realizing image coding of dynamic images, time redundancy is reduced by using information expressing from which portion of a previous picture a given portion of a current picture is moved (i.e., a motion vector). One of methods of extracting such a motion vector is designated as a block matching method.

FIG. 16 is a diagram for showing the principle of the block matching method. In the block matching method, a target frame image (target frame) to be coded is compared with a search frame image (search frame) in which a motion vector is searched for, and a block most similar to (namely, having the highest correlation with) a coding target block in the target frame (namely, a best match block) is extracted from a search range in the search frame, thereby detecting a motion vector. This block matching method is widely used in the motion compensative prediction for image compression coding.

In the block matching method, correlation between one coding target block and plural candidate blocks within the search range in the search frame are respectively calculated, and a candidate block having the highest correlation is selected as the best match block, so that a positional difference between the best match block and the coding target block can be detected as a motion vector.

As an evaluation value indicating the correlation, an accumulation value of square errors or absolute errors is generally used. A difference between a coding target block and a candidate block is smaller as the correlation therebetween is higher. Therefore, when the accumulation value of square errors or absolute errors is used as the evaluation value, the evaluation value is smaller as the correlation is higher.

A motion vector is detected for the purpose of detecting, in the search frame, a block where a coding amount can be most effectively reduced in the motion compensative prediction coding. Accordingly, the accuracy in detecting a motion vector is one of significant performances of a motion vector detecting device. The motion vector detection is, however, a process requiring a particularly large amount of calculation in an image coding algorithm. Therefore, when the motion vector detection is realized by hardware, power consumption is disadvantageously large because the process requires a long period of time and a large hardware scale. Furthermore, a real time process of the detection using software is very difficult to execute at present. Under such circumstances, it is desired to realize motion vector detection having high accuracy and high processing efficiency.

In some of conventional motion vector detecting devices, a search range is made small with regard to an image with small movement, so as to shorten a processing time for the detection of a motion vector, and a search range is enlarged with regard to an image with large movement. Thus, the processing efficiency can be improved without degrading the detection accuracy.

For example, a motion vector detecting device disclosed in Japanese Laid-Open Patent Publication No. 8-32969 comprises means for evaluating correlation with a block in the same position as a process block, means for selectively controlling the size of a search range in accordance with the correlation evaluation of the block, and means for detecting a motion vector by evaluating correlations with respective candidate blocks in the search range. In this device, the search range is reduced as the correlation of the block in the same position is increased. As a result, a motion vector can be accurately detected with a small amount of calculation.

Such a conventional motion vector detecting device has, however, the following problems:

A picture shot by a camera or the like occasionally includes so-called pan images in which the entire image is moved in a given direction. In a pan image, a shot substance itself is not changed but the position thereof is moved in the given direction.

In the aforementioned conventional motion vector detecting device, the size of the search range is set through the correlation evaluation with a block in the same position as the process block. Therefore, for example, in a pan image, the correlation in the same position is small, and hence, a large search range is inevitably set. Also, prior to the motion vector detection, it is necessary to execute the correlation evaluation in the same position, and hence, the process can be disadvantageously complicated.

SUMMARY OF THE INVENTION

The object of the invention is realizing accurate and efficient motion vector detection with regard to images having a variety of characteristics, and in particular, realizing precise and rapid motion vector detection with regard to a pan image.

Specifically, the motion vector detecting device of this invention comprises motion vector detecting means for calculating a correlation evaluation value indicating correlation between a coding target block in a target frame and a candidate block within a search range of a search frame and for detecting a motion vector with regard to the coding target block on the basis of the correlation evaluation values; original search range storing means for storing pixel data of an original search range and for supplying pixel data read in accordance with a given memory address to the motion vector detecting means; control means for generating a first search width that is a pixel width in the horizontal direction of the search range, a second search width that is a pixel width in the vertical direction of the search range and an offset value indicating a relative position of the search range to the original search range; and address generating means for generating the memory address supplied to the original search range storing means on the basis of the first and second search widths and the offset value generated by the control means.

Preferably, in the motion vector detecting device, the motion vector detecting means supplies, to the control means, a detected motion vector and a correlation evaluation value corresponding to the motion vector, and the control means generates the first and second search widths and the offset value on the basis of the motion vector and the correlation evaluation value supplied by the motion vector detecting means.

Furthermore, the method of this invention of detecting a motion vector with regard to a coding target block comprises a first step of determining whether or not a predetermined area in a target frame includes a portion similar to the coding target block; a second step of, when it is determined that a similar portion is included in the first step, setting a first area in the search frame including the similar portion and smaller than the predetermined area as a search range for motion vector detection; and a third step of, when it is determined that a similar portion is not included in the first step, setting an area larger than the first area as the search range for motion vector detection.

Preferably, in the method of detecting a motion vector, determination of the first step is made on the basis of a correlation evaluation value corresponding to a motion vector detected with regard to a range setting reference block that is a block in the same position as or in the vicinity of the coding target block in a frame previous to a target frame, and in the second step, a position of the search range is set on the basis of the motion vector detected with regard to the range setting reference block.

Preferably, in the method of detecting a motion vector, the first step includes a step of executing a predetermined pixel calculation on each of a unit area including at least a part of the coding target block and plural comparison areas each having the same size as the unit area and provided in the vicinity of the same position as the coding target block in the search frame, and determination of the first step is made on the basis of results of the pixel calculation, and in the second step, a comparison area most similar to the unit area is selected from the plural comparison areas on the basis of the results of the pixel calculation, and a position of the search range is set on the basis of a position of the selected comparison area.

Moreover, the method of detecting a motion vector of this invention comprises a search range setting step of setting a search range for motion vector detection; and a motion vector detecting step of detecting a motion vector with regard to a coding target block on the basis of correlation with a candidate block in the search range, wherein the search range setting step includes a step of setting a size of the search range on the basis of a correlation evaluation value corresponding to a motion vector detected with regard to a range setting reference block that is a block in the same position as or in the vicinity of the coding target block in a frame previous to a target frame.

Alternatively, the method of detecting a motion vector of this invention comprises a search range setting step of setting a search range for motion vector detection; and a motion vector detecting step of detecting a motion vector with regard to a coding target block on the basis of correlation with a candidate block in the search range, wherein the search range setting step includes a step of setting a position of the search range is set on the basis of a motion vector detected with regard to a range setting reference block that is a block in the same position as or in the vicinity of the coding target block in a frame previous to a target frame.

BRIEF DESCRIPTION OF THE DRAWINGS

FIGS. 2(a) and 2(b) are schematic diagrams for showing examples of a search range for motion vector detection according to the first embodiment, wherein FIG. 2(a) shows an example of a large search range and FIG. 2(b) shows an example of a small search range;

DETAILED DESCRIPTION OF THE INVENTION

EMBODIMENT 1

Figure 1:
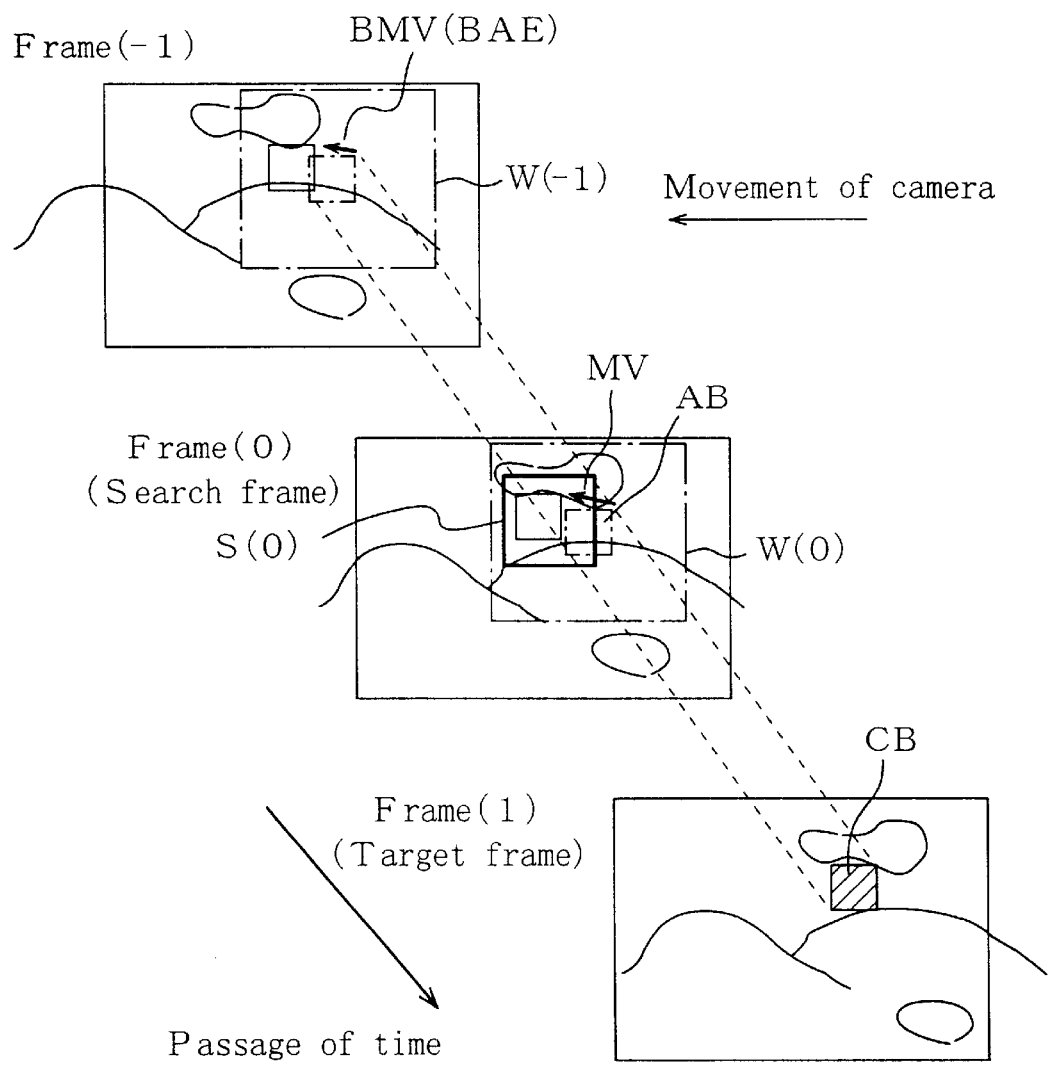
FIG. 1 is a diagram for illustrating a first embodiment of the invention, and shows timewise continuous three frame images corresponding to a panned picture.

FIG. 1 is a diagram for showing timewise continuous three frame images, corresponding to a so-called panned picture shot with a camera moved in a leftward direction. When a panned picture is seen in a very short period of time, it can be said, in general, that a shot substance is moving at a given rate. Accordingly, in a first embodiment, in detecting a motion vector MV with regard to a coding target block CB in a target frame (frame (1)), a block AB of a search frame (frame (0)) in the same position as the coding target block CB is set as a range setting reference block, and on the basis of a motion vector BMV detected with regard to the range setting reference block AB and a correlation evaluation value BAE corresponding to the motion vector BMV, the size and the position of a search range are determined. In this manner, as is shown in FIG. 1, a search range for the motion vector detection can be narrowed down to and set in an area where the image of the coding target block CB is estimated to be present in the search frame. Accordingly, a motion vector can be accurately and rapidly detected.

Figure 2:
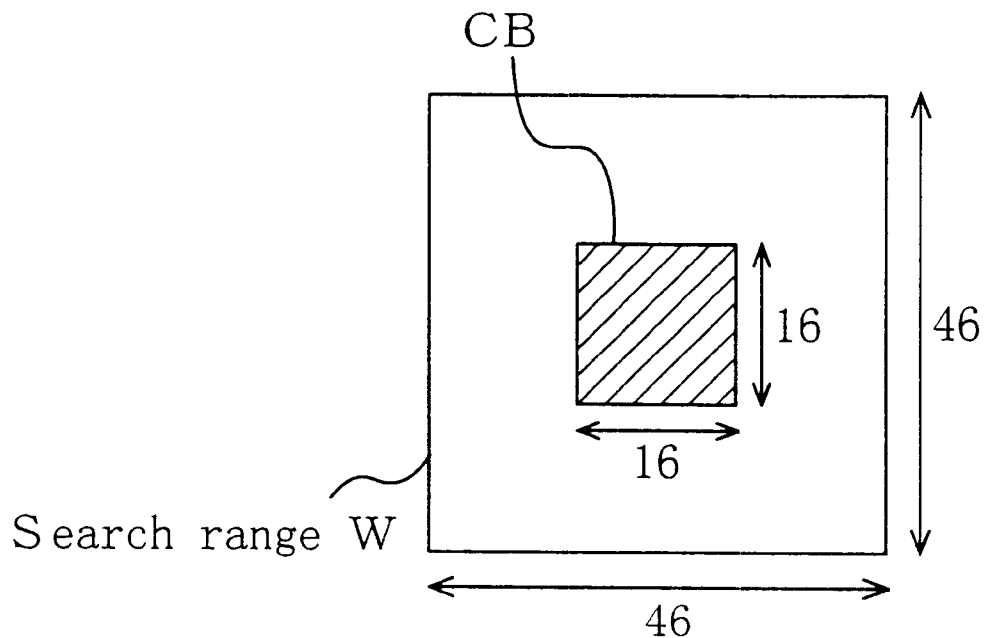
Figure 2:
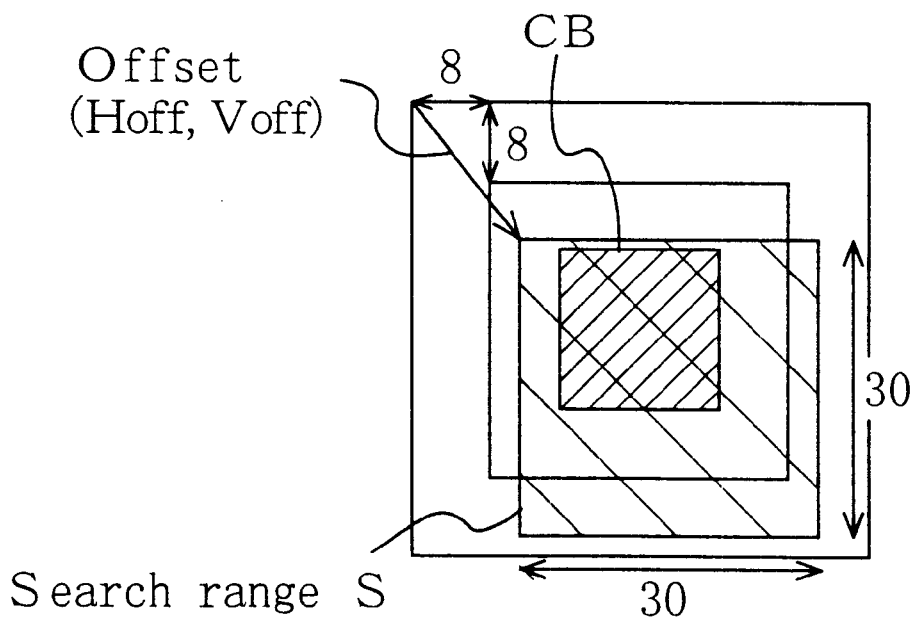

FIGS. 2(a) and 2(b) are schematic diagrams for showing examples of the search range for the motion vector detection according to this embodiment. In this embodiment, the search range can be in any of two types of sizes. FIGS. 2(a) and 2(b) show examples of the search range for the coding target block CB having a general size (i.e., 16 pixels in the horizontal direction by 16 pixels in the vertical direction) of an image coding standard such as MPEG. FIG. 2(a) shows a search range of 46 pixels in the horizontal direction by 46 pixels in the vertical direction as an example of a large search range W, and FIG. 2(b) shows a search range of 30 pixels in the horizontal direction by 30 pixels in the vertical direction as an example of a small search range S.

The position of the small search range S is expressed by using a relative position to the large search range W. In this case, a vector starting at the upper left corner, that is, the search start point of the search range W and ending at the upper left corner, that is, the search start point of the search range S is defined as an offset (Hoff, Voff), and the position of the search range S is expressed by using offset values corresponding to the components of the offset. At this point, for example, when a picture is a still image and the search range S is set in the position of the coding target block CB, the offset values are, as is shown in FIG. 2(b):

Hoff=8

Voff=8

Furthermore, a pixel width along the horizontal direction of the search range is designated as a search horizontal (H) pixel width corresponding to a first search width, and a pixel width along the vertical direction of the search range is designated as a search vertical (V) pixel width corresponding to a second search width.

Figure 3:
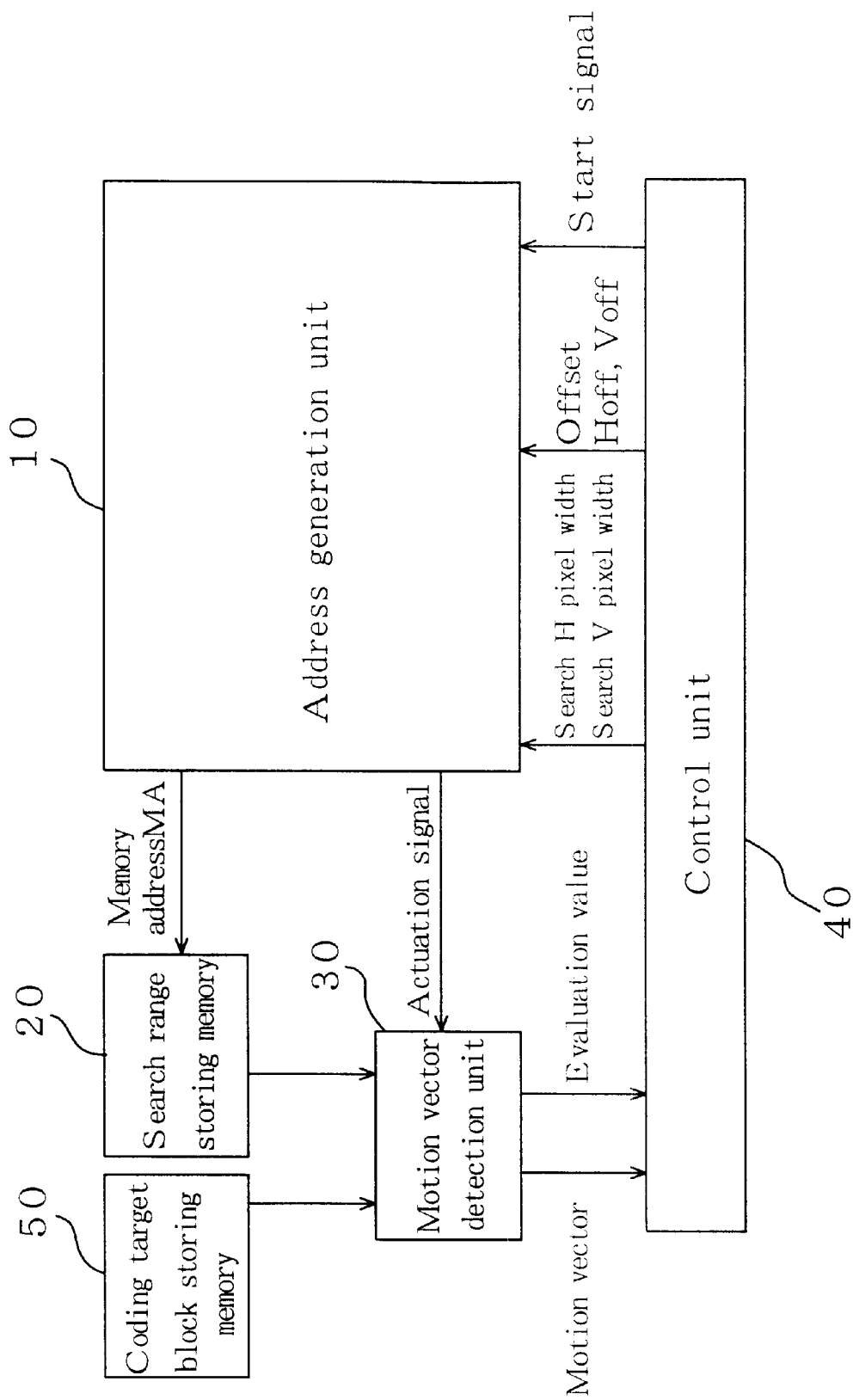
FIG. 3 is a diagram for showing the structure of a motion vector detecting device according to an embodiment of the invention.

FIG. 3 is a diagram for showing the structure of a motion vector detecting device of this embodiment. In FIG. 3, a reference numeral 10 denotes an address generation unit for generating a memory address MA on the basis of a search H pixel width, a search V pixel width and an offset, a reference numeral 20 denotes a search range storing memory corresponding to original search range storing means for storing image data of an original search range, a reference numeral 30 denotes a motion vector detection unit for calculating an evaluation value indicating correlation between a coding target block and a candidate block in a search range and for outputting a motion vector corresponding to the highest correlation and an evaluation value corresponding to this motion vector, a reference numeral 40 denotes a control unit for determining a search H pixel width, a search V pixel width and an offset on the basis of the motion vector and the evaluation value output by the motion vector detection unit 30 and outputting the calculated values to the address generation unit 10, and a reference numeral 50 denotes a coding target block storing memory for storing image data of a coding target block. Here, the original search range is the large search range W of 46 pixels by 46 pixels.

Figure 4:
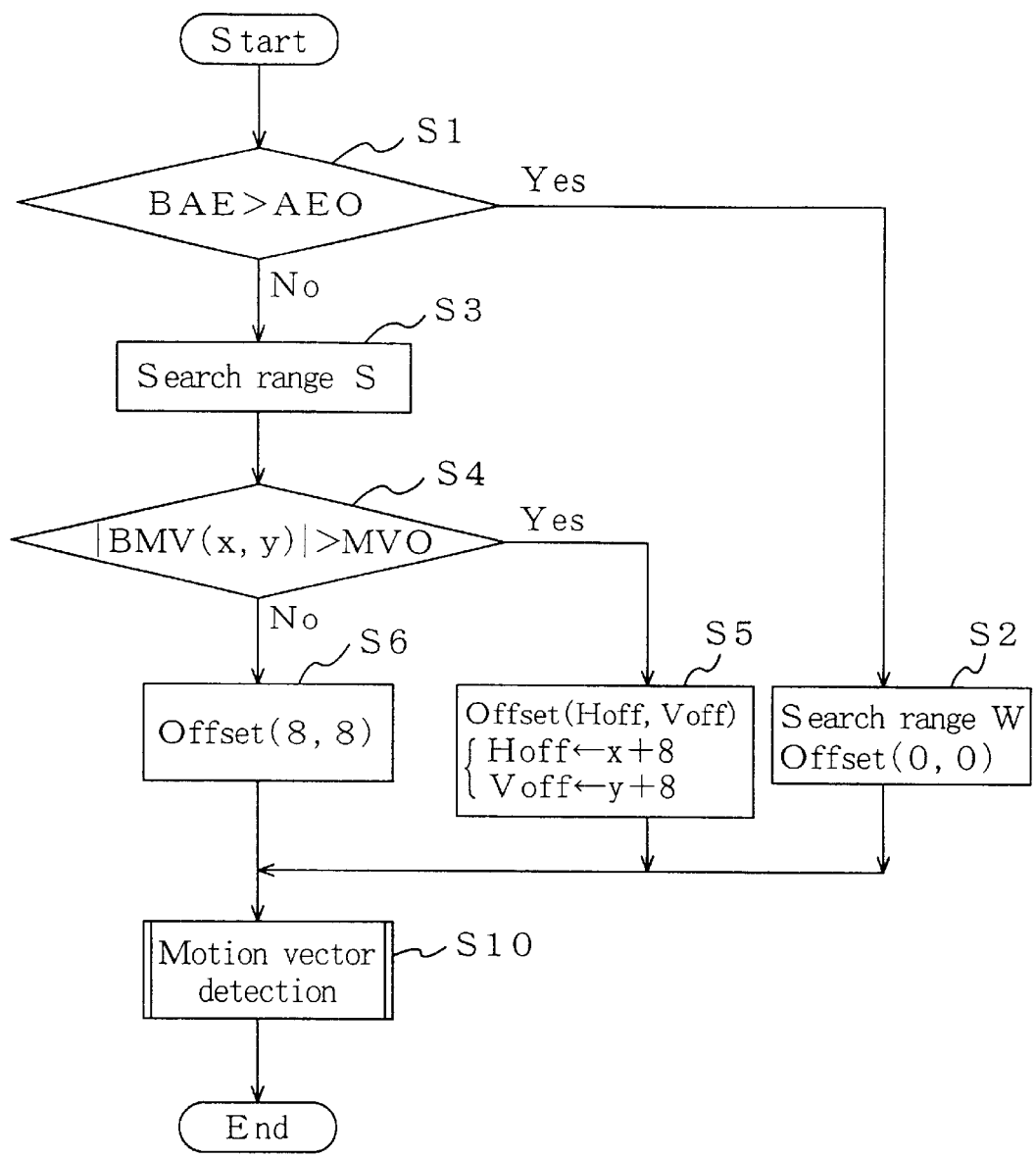
FIG. 4 is a flowchart for showing an operation of a control unit of the first embodiment.

FIG. 4 is a flowchart for showing an operation of the control unit 40. Now, the operation of the control unit 40 will be described with reference to the flowchart of FIG. 4 and FIG. 1.

It is herein assumed that the search range for the motion vector detection is to be set with regard to the coding target block CB in the target frame. The control unit 40 supplies, to the address generation unit 10, a search H pixel width, a search V pixel width and an offset representing the search range and determined on the basis of the motion vector BMV with regard to the range setting reference block AB in the search frame and the correlation evaluation value BAE corresponding to the motion vector BMV.

In a step S1, the correlation evaluation value BAE corresponding to the range setting reference block AB is compared with a threshold value AE0. When the evaluation value BAE is found to be larger than the threshold value AE0 as a result of the comparison, it is determined that there is no portion similar to the coding target block CB in a predetermined area in the search frame because the correlation of the motion vector BMV is small. Therefore, without narrowing down the search range, the large search range W of 46 pixels by 46 pixels, that is the original search range, is set as the search range for the motion vector detection (step S2). Specifically, in this case, both the search H pixel width and the search V pixel width are defined as "46" and the offset is defined as (0, 0).

When the correlation evaluation value BAE corresponding to the range setting reference block AB is not larger than the threshold value AE0, it is determined that there is a portion similar to the coding target block CB in the predetermined area in the search frame because the correlation of the motion vector BMV is large. Therefore, the small search range S of 30 pixels by 30 pixels is set as the search range for the motion vector detection (step S3). Then, in a step S4, the size of the motion vector BMV, i.e., |BMV (x, y)|, of the range setting reference block AB is compared with a threshold value MV0.

When the size of the motion vector BMV is found to be larger than the threshold value MV0 as a result of the comparison, it is determined that the movement of the coding target block CB is large, and the offset is set by using the components of the motion vector BMV (step S5). Specifically, the components of the offset (Hoff, Voff) are set as follows:

Hoff=x+8

Voff=y+8

In other words, in this case, both the search H pixel width and the search V pixel width are defined as "30" and the offset is defined as (x+8, y+8).

When the size of the motion vector BMV is not larger than the threshold value MV0, it is determined that the movement of the coding target block CB is small and that the image therein is still, and the offset is set at (8, 8). Specifically, in this case, both the search H pixel width and the search V pixel width are defined as "30" and the offset is defined as (8, 8).

The address generation unit 10 generates a memory address MA on the basis of the search H pixel width, the search V pixel width and the offset output by the control unit 40. The motion vector detection unit 30 detects a motion vector with regard to the coding target block CB by using pixel data of the search range read from the search range storing memory 20 (step S10).

Figure 5:
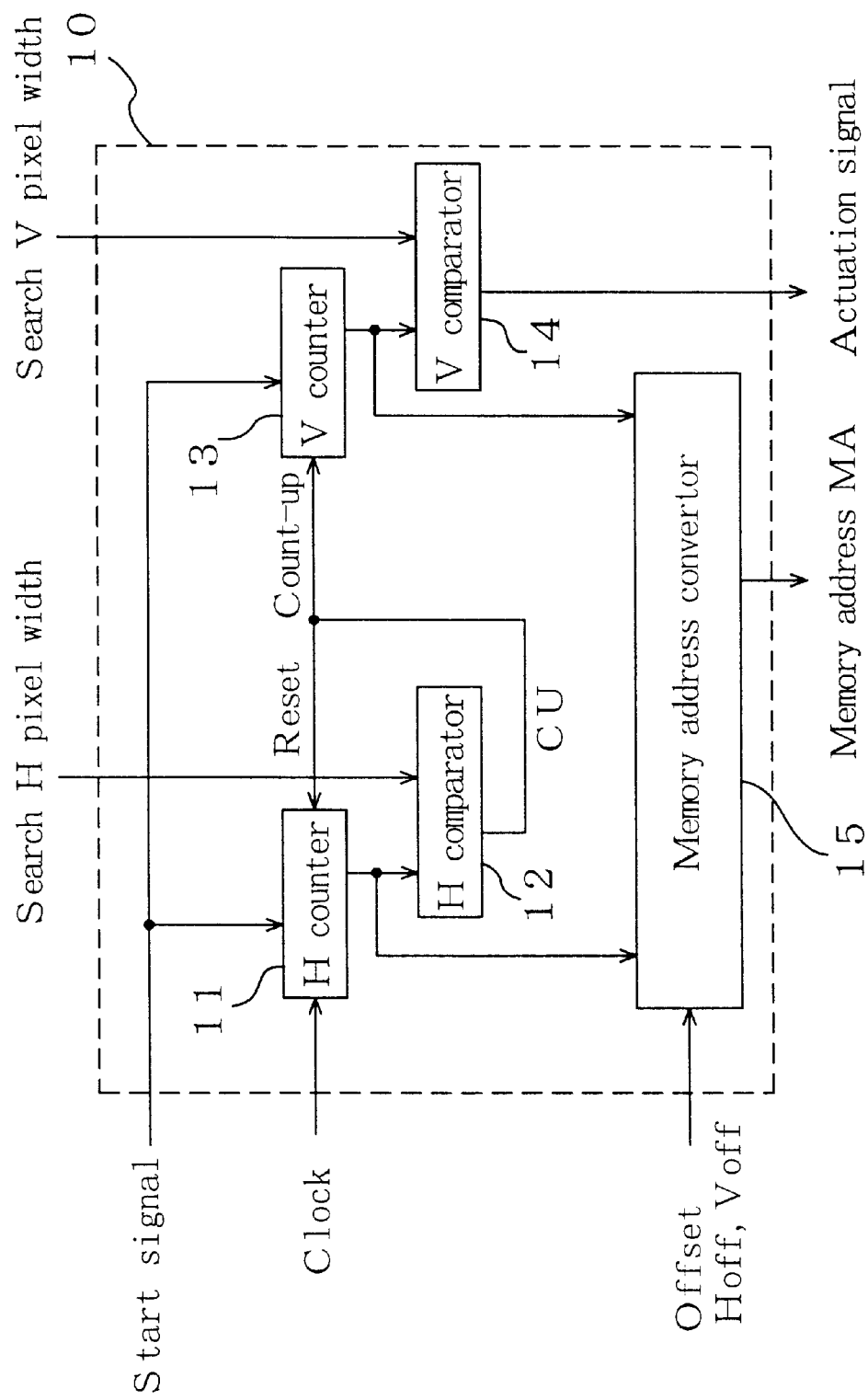
FIG. 5 is a block diagram for showing the configuration of an address generation unit.

FIG. 5 is a block diagram for showing the configuration of the address generation unit 10. As is shown in FIG. 5, the address generation unit 10 includes an H counter 11 as a first counter for counting a clock, an H comparator 12 as a comparator for comparing the search H pixel width and the count value of the H counter 11, resetting the count value of the H counter 11 when the compared values are the same, and outputting a count-up signal CU, a V counter 13 as a second counter for counting the count-up signal CU, a V comparator 14 for comparing the search V pixel width and the count value of the V counter 13 and generating an actuation signal for completing the operation of the motion vector detection unit 30 when the compared values are the same, and a memory address converter 15 for generating the memory address MA of the search range storing memory 20 on the basis of the offset and the count values of the H counter 11 and the V counter 13. The H counter 11 and the V counter 13 are reset in accordance with a start signal supplied by the control unit 40, so that the address generation unit 10 can be actuated.

Now, the operation of the address generation unit 10 of FIG. 5 will be described with reference to FIGS. 6 through 8.

Figure 6:
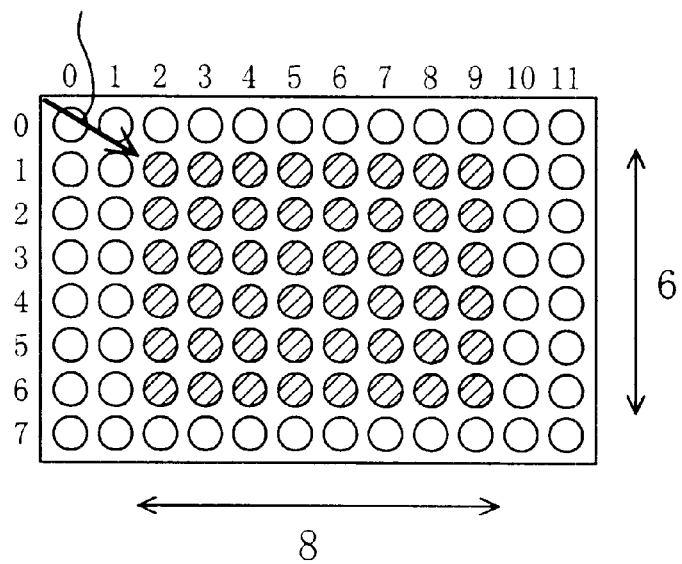
FIG. 6 is a diagram for showing a relationship between an original search range and a search range for motion vector detection.

FIG. 6 is a diagram for showing a relationship between an original search range stored in the search range storing memory 20 and a search range for the motion vector detection. As is shown in FIG. 6, it is herein assumed that the search range storing memory 20 stores pixel data of 12 pixels in the horizontal direction by 8 pixels in the vertical direction as the original search range, and that a search range determined by the search H pixel width of 8, the search V pixel width of 6 and the offset of (2, 1) is set as the search range for the motion vector detection.

Figure 7:
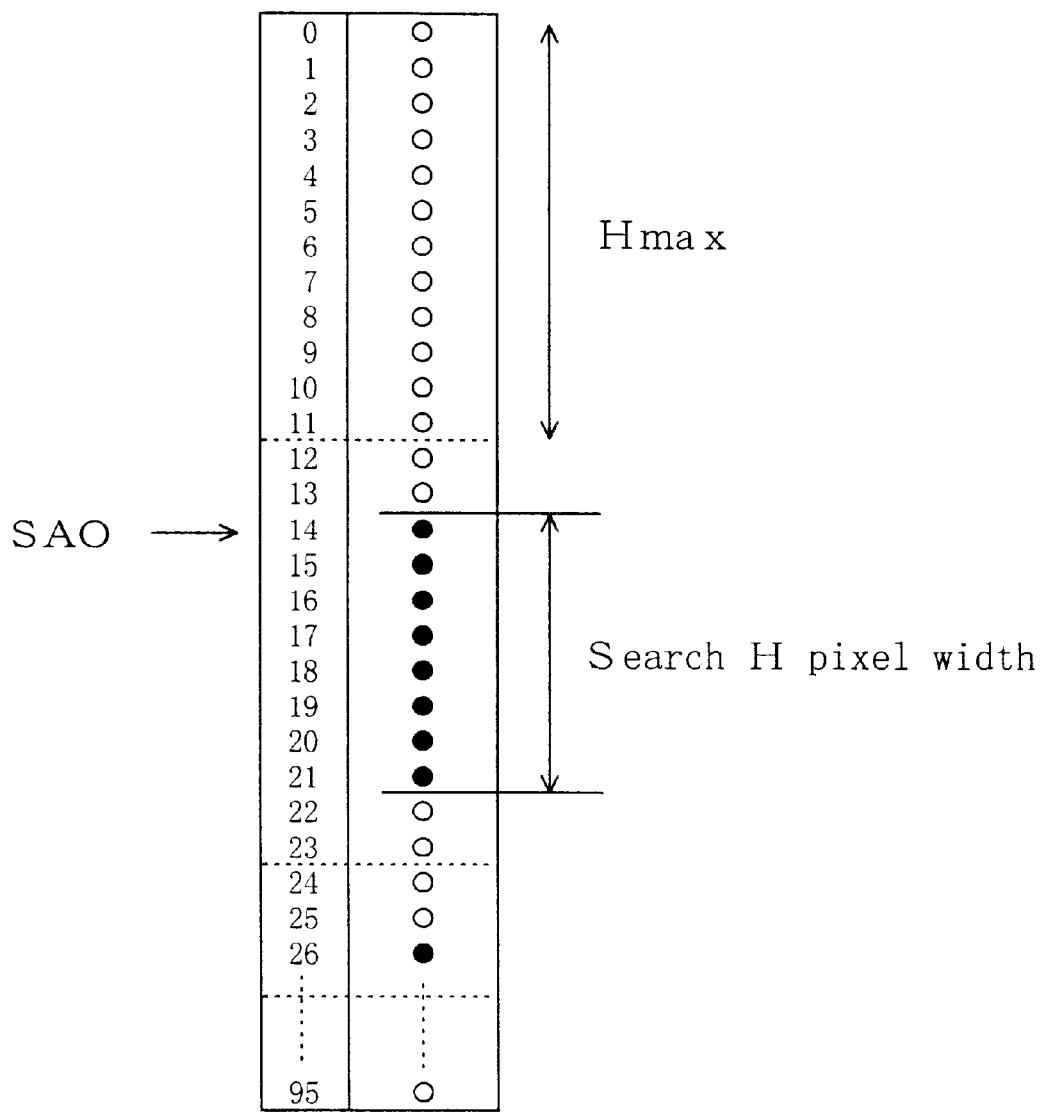
FIG. 7 is a diagram for showing a result of mapping of two-dimensional pixel data of FIG. 6 in a one-dimensional address space of a search range storing memory.

FIG. 7 is a diagram resulting from mapping of the two-dimensional pixel data of FIG. 6 in a one-dimensional address space of the search range storing memory 20. The address generation unit 10 generates the memory address MA to be used for reading the pixel data of the search range for the motion vector detection from the search range storing memory 20.

Figure 8:
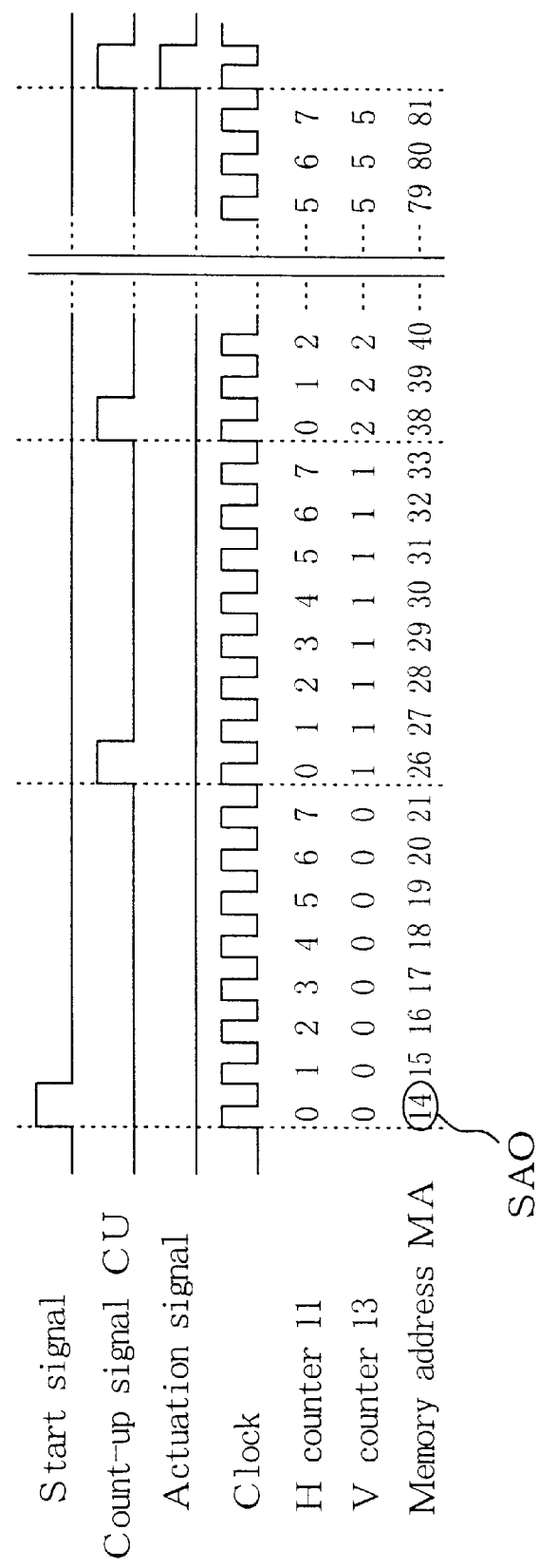
FIG. 8 is a timing chart for showing an operation of the address generation unit of the first embodiment.

FIG. 8 is a timing chart for showing the operation of the address generation unit 10. As is shown in FIG. 8, when the start signal is input, the H counter 11 starts counting the clock. When the count value of the H counter 11 becomes equal to a value indicating the search H pixel width, the H counter 12 outputs the count-up signal CU, thereby resetting the count value of the H counter 11. The V counter 13 counts the count-up signal CU. When the count value of the V counter 13 becomes equal to a value indicating the search V pixel width, the V comparator 14 outputs the actuation signal.

In response to the offset (Hoff, Voff), the memory address convertor 15 calculates an address SA0 as a starting point of the search range for the motion vector detection on the basis of a pixel width Hmax in the horizontal direction and a pixel width Vmax in the vertical direction of the original search range stored in the search range storing memory 20. The starting address SA0 is obtained by the following formula:
SA0=Hmax×Voff+Hoff In the case exemplified in FIG. 6, the starting address SA0 is:

SA0=12×1+2=14

Then, the memory address convertor 15 calculates the memory address MA by the following formula:

MA=SA0+Hmax×(the count value of the V counter 13) +the count value of the H counter 11

As a result, the memory address MA is varied as is shown in FIG. 8. For example, from the starting address SA0 up to an address corresponding to the search H pixel width, the memory address MA can be obtained by adding the count value of the H counter 11 to the starting address SA0 as is shown in FIG. 7. In response to the input of a subsequent clock, the count value of the H counter 11 is set at 0 and the count value of the V counter 13 is set at 1. At this point, the memory address MA is:

MA=14+12×1+0=26

In this manner, according to this embodiment, a motion vector can be accurately and efficiently detected even in a panned picture.

In this embodiment, a block of the search frame in the same position as the coding target block is used as the range setting reference block. Instead, a block of the search frame in the vicinity of the same position as the coding target block can be used as the range setting reference block. Also, a block in the same position or in the vicinity of the same position as the coding target block in a frame further preceding the search frame can be used as the range setting reference block.

Furthermore, although the search range of this embodiment has two types of sizes, the search range can be in a larger number of types of sizes. Also, the search H pixel width and the search V pixel width can be made variable, with the components of a motion vector with regard to a range setting reference block used as an evaluation index.

MODIFICATION OF EMBODIMENT 1

In the first embodiment, subsampling can be also adopted. In this case, the control unit 40 inputs to the address generation unit 10, in addition to the search H pixel width, the search V pixel width and the offset value, a subsample number DH in the horizontal direction of the search range as a first subsample number and a subsample number DV in the vertical direction as a second subsample number.

Figure 9:
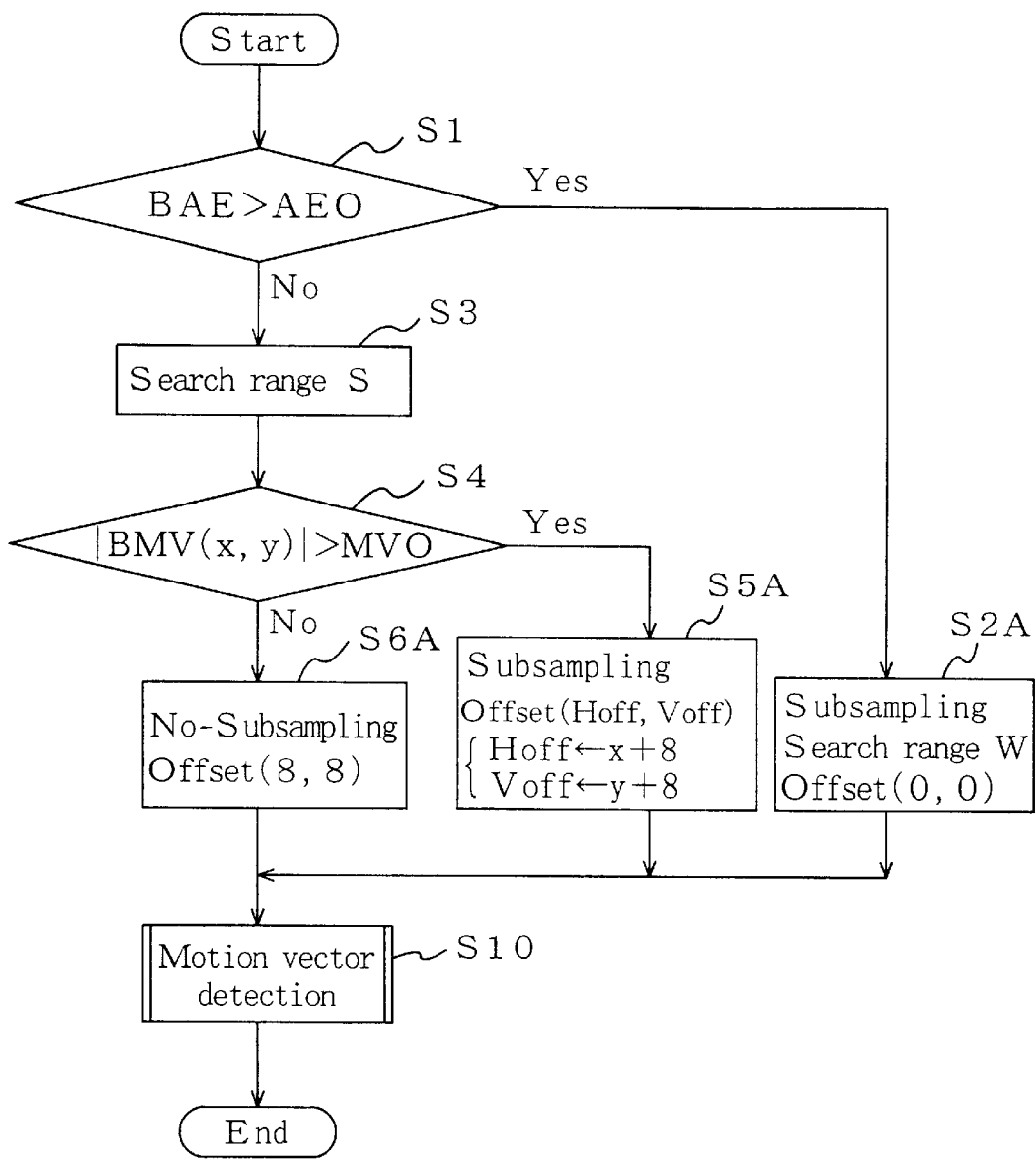
FIG. 9 is a flowchart for showing an operation of a control unit according to a modification of the first embodiment.

FIG. 9 is a flowchart for showing the operation of the control unit 40 according to this modification. This flowchart is different from that shown in FIG. 4 in specifying whether or not subsampling is executed in addition to setting the size and the position of the search range. Specifically, in a step S2A for setting the large search range W and in a step S5A for setting the small search range S in a position other than the position of the coding target block CB, the execution of subsampling is specified. In a step S6A for setting the small search range S in the same position as the coding target block CB, the executing of subsampling is not specified.

Figure 10A:
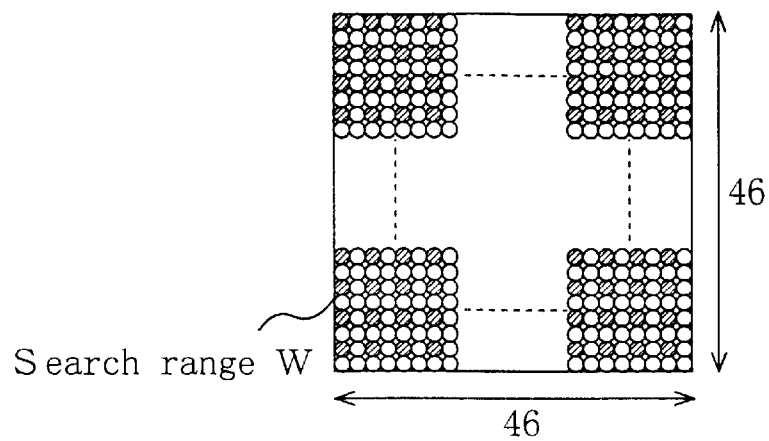
FIGS. 10(a) through 10(c) are schematic diagrams for showing examples of a search range for motion vector detection according to the modification of the first embodiment.
Figure 10B:
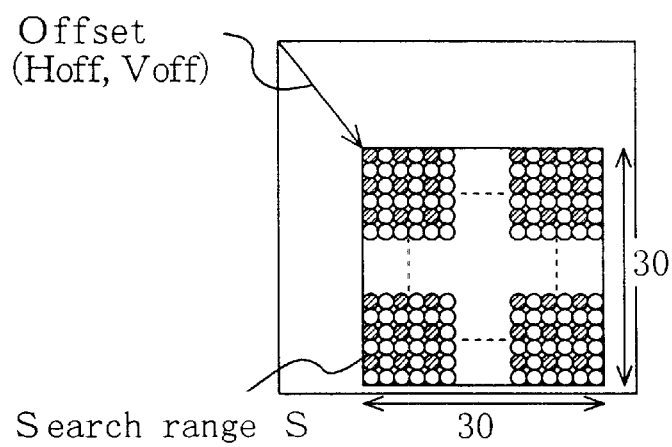
Figure 10C:
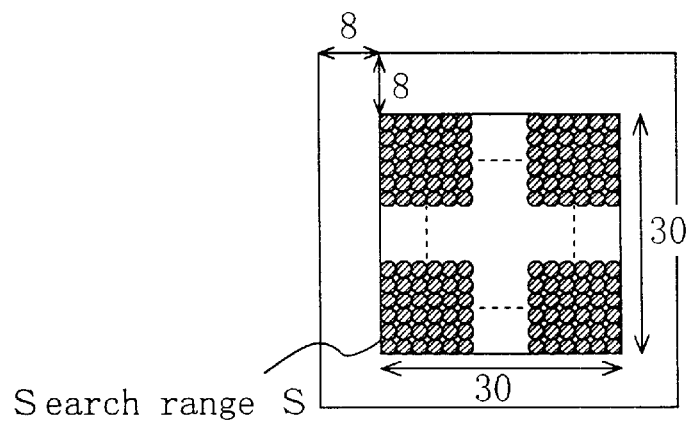

FIGS. 10(a) through 10(c) are schematic diagrams for showing examples of the search range for the motion vector detection according to this modification. In this case, the subsample number DH in the horizontal direction and the subsample number DV in the vertical direction are both set at 2. FIG. 10(a) shows an example of the large search range W adopted when the executing of subsampling is specified, FIG. 10(b) shows an example of the small search range S adopted when the execution of subsampling is specified, and FIG. 10(c) shows an example of the small search range S adopted when the execution of subsampling is not specified. In the step S6A, it is because the movement of the coding target block CB is determined to be small that the small search range S is set in the same position as the coding target block CB. In this case, since degradation of the detection accuracy is undesirable, the execution of subsampling is not specified as is shown in FIG. 10(c).

Now, the operation of the address generation unit 10 of this modification will be described with reference to FIGS. 11 through 13.

Figure 11:
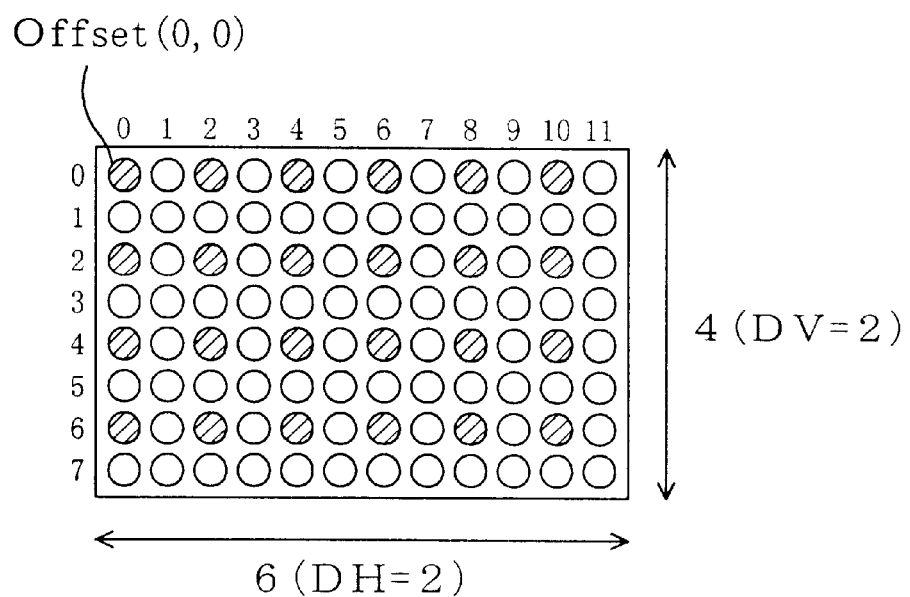
FIG. 11 is a diagram for showing a relationship between an original search range and a search range for the motion vector detection.

FIG. 11 is a diagram for showing the relationship between an original search range stored in the search range storing memory 20 and a search range for the motion vector detection. It is herein assumed, as is shown in FIG. 11, that the search range for the motion vector detection is determined by defining the search H pixel width as 6, the search V pixel width as 4, the offset as (0, 0), and both the subsample numbers DH and DV as 2.

Figure 12:
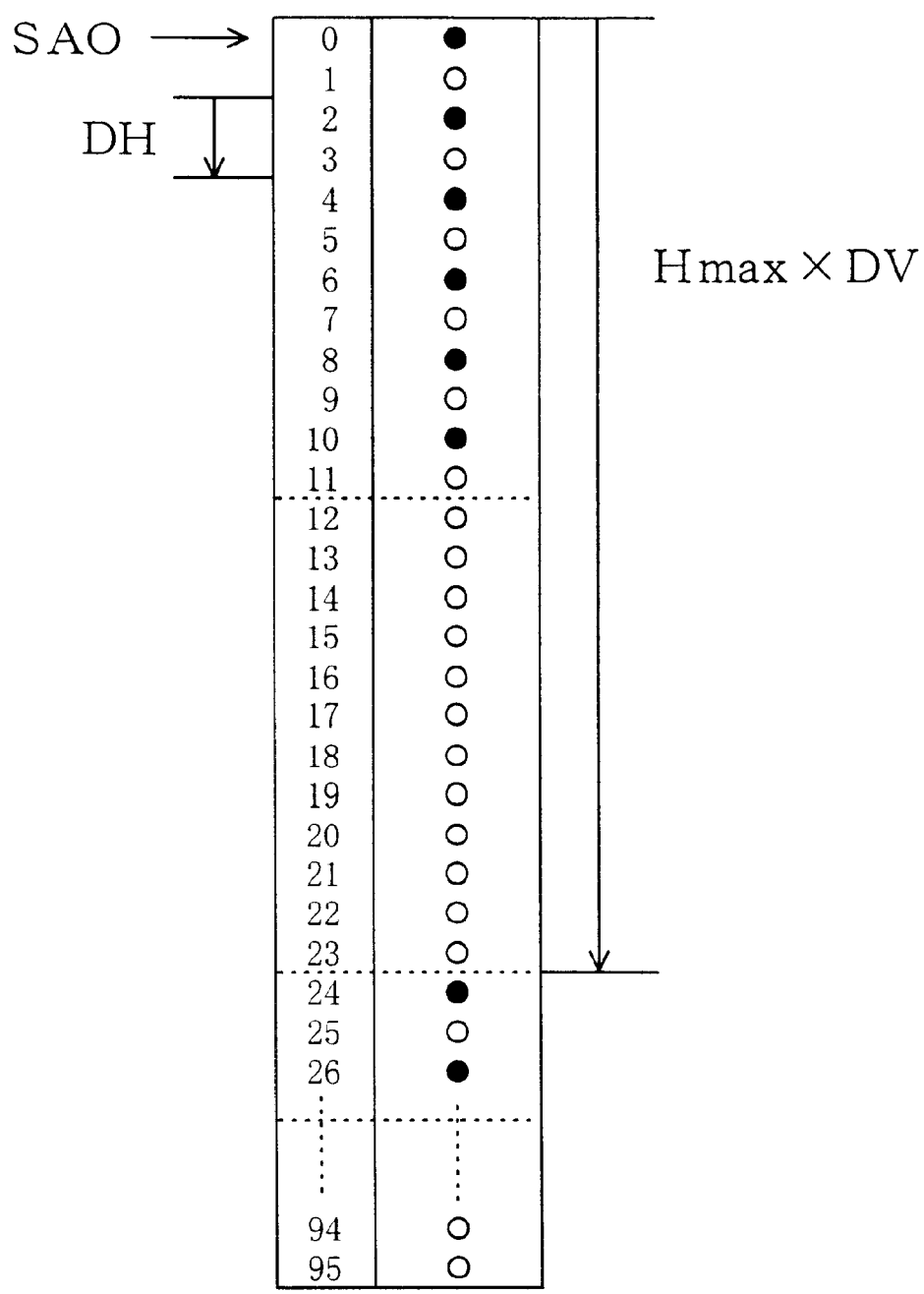
FIG. 12 is a diagram for showing a result of mapping of two-dimensional pixel data of FIG. 11 in a one-dimensional address space of a search range storing memory.

FIG. 12 is a diagram resulting from mapping the two-dimensional pixel data of FIG. 11 in a one-dimensional address space of the search range storing memory 20.

Figure 13:
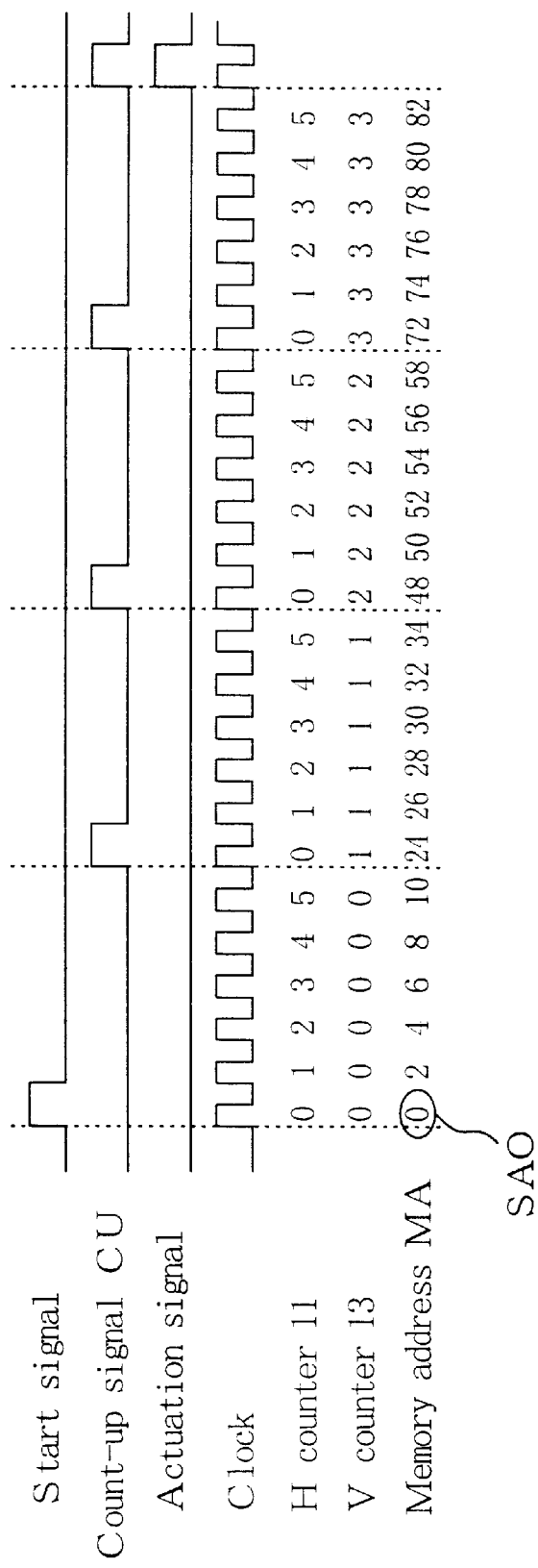
FIG. 13 is a timing chart for showing an operation of an address generation unit according to the modification of the first embodiment.

FIG. 13 is a timing chart for showing the operation of the address generation unit 10. In this modification, the memory address convertor 15 calculates a memory address MA by the following formula:

MA=SA0+Hmax×(the count value of the V counter 13)×DV +(the count value of the H counter 11)×DH As a result, the memory address MA is varied as is shown in FIG. 12.

EMBODIMENT 2

In a second embodiment of the invention, plural blocks having the same size as a coding target block are set in the search frame in the vicinity of the same position as the coding target block, and a predetermined pixel calculation is conducted with regard to the coding target block and each of the plural blocks set in the search frame. On the basis of the results of the calculation, the size and the position of the search range for the motion vector detection are set. Herein, an accumulating calculation of pixel data in the block is performed as the predetermined pixel calculation.

Figure 14:
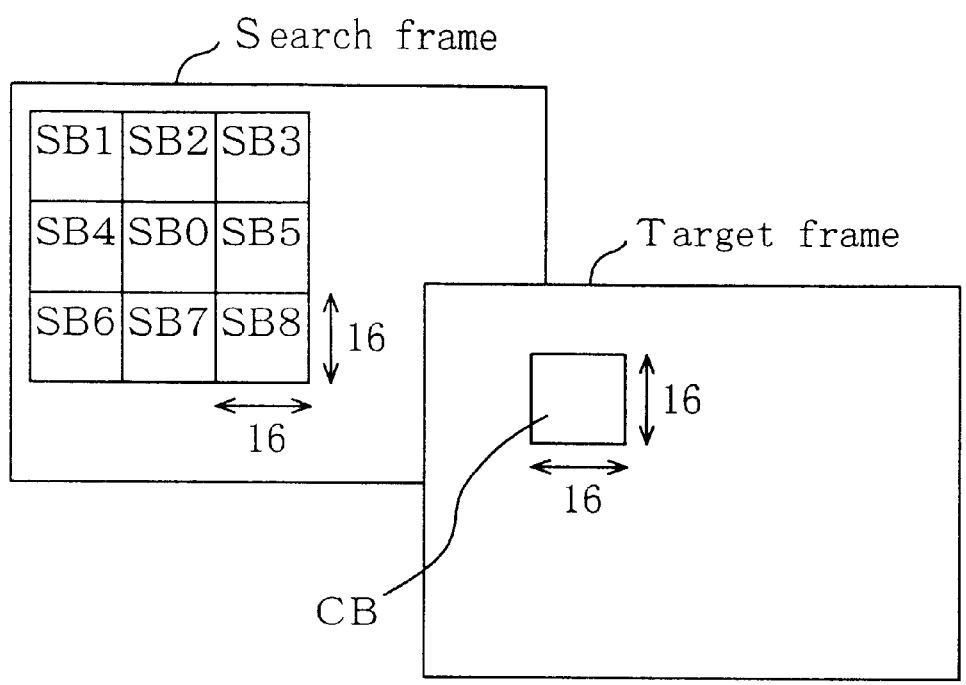
FIG. 14 is a diagram for showing an exemplified setting of comparison areas in a search frame according to a second embodiment of the invention.

FIG. 14 is a diagram for showing an example of the blocks set in the search frame according to this embodiment. In FIG. 14, with regard to a coding target block CB of 16 pixels by 16 pixels as a unit area, nine blocks SB0 through SB8 each of 16 pixels by 16 pixels are set in the search frame as comparison areas.

A motion vector detecting device of this embodiment has the structure as is shown in FIG. 3 similarly to that of the first embodiment. However, the control unit 40 does not receive a motion vector and an evaluation value output by the motion vector detection unit 30 but receives image data of each frame instead.

Figure 15:
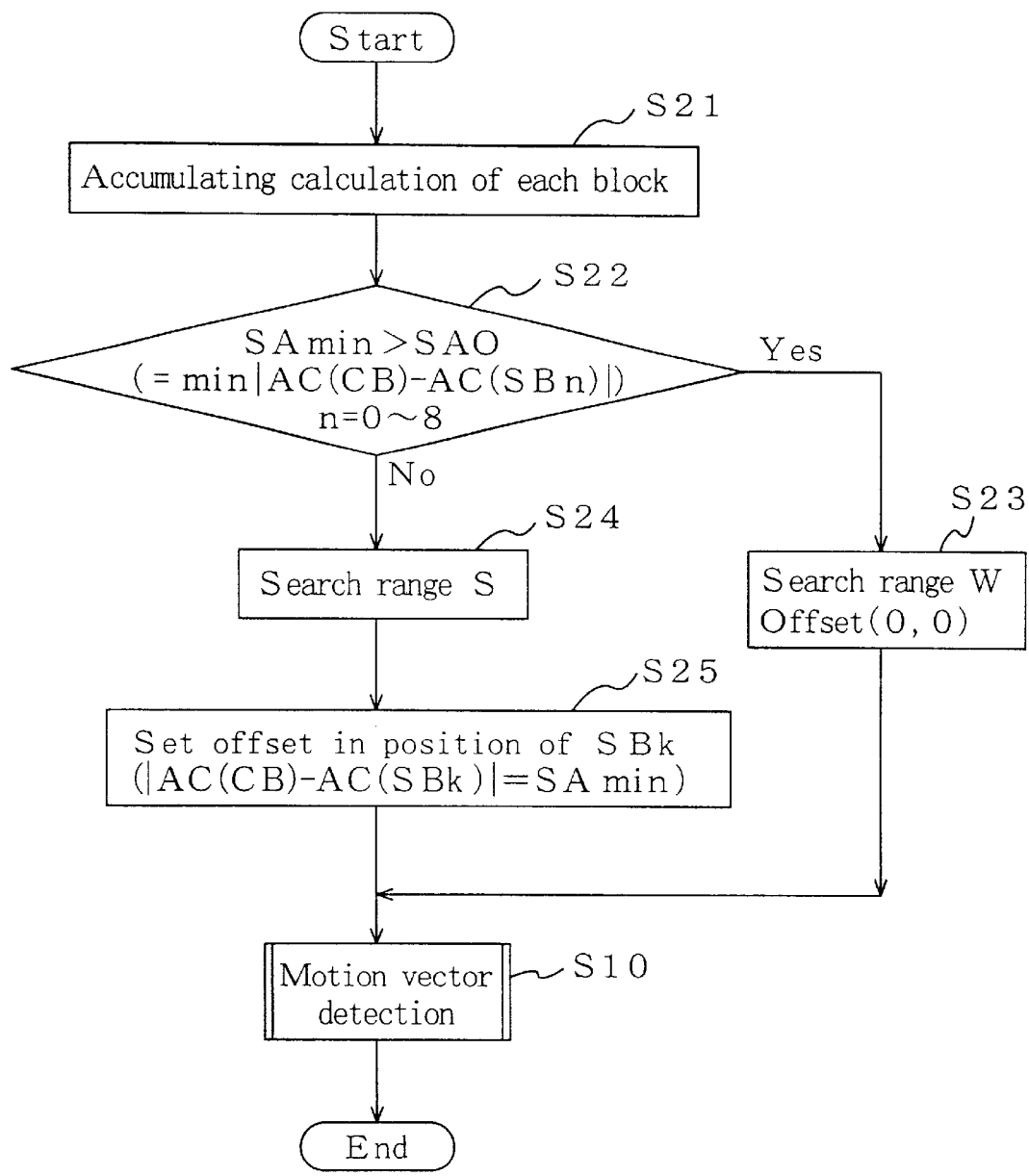
FIG. 15 is a flowchart for showing an operation of a control unit of the second embodiment.
Figure 16:
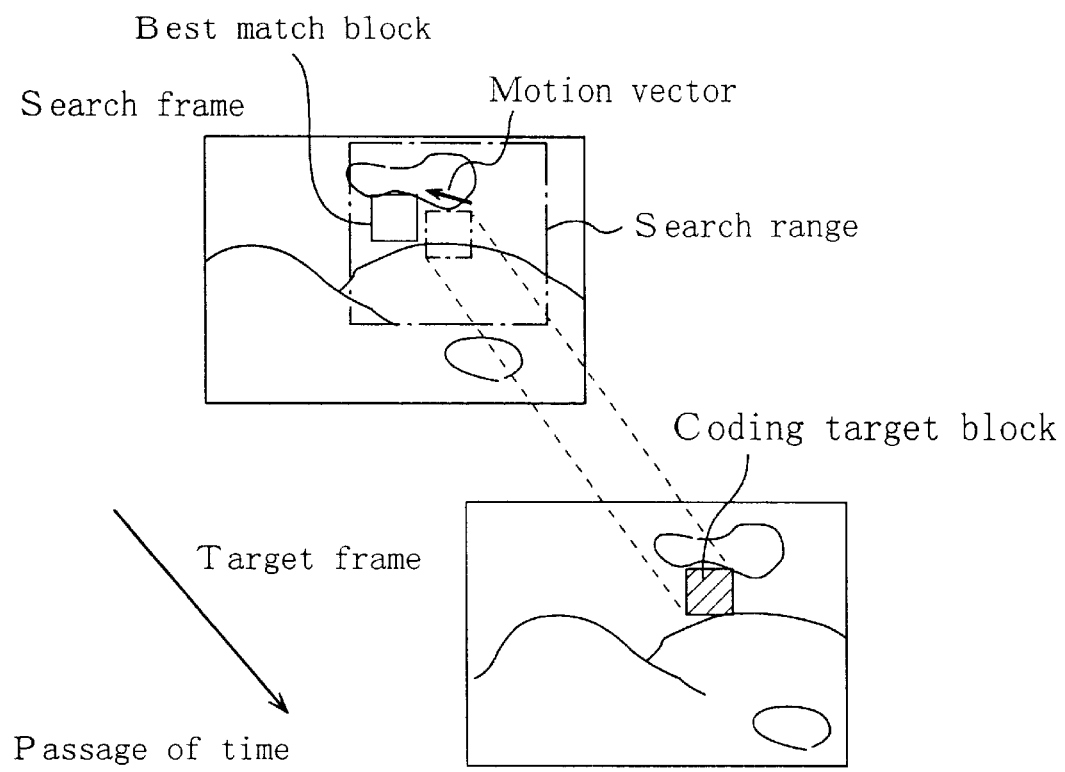
FIG. 16 is a diagram for illustrating a block matching method.

FIG. 15 is a flowchart for showing the operation of the control unit 40 of the motion vector detecting device of this embodiment. First, in a step S21, with regard to the coding target block and each block set in the search frame, the accumulating calculation of the pixel data of the block is executed. In a step S22, a minimum absolute value SAmin of a difference between an accumulation result AC(CB) of the coding target block and an accumulation result AC(SBn) (wherein n=0 through 8) of each block set in the search frame is compared with a threshold value SA0. When the minimum value SAmin is found to be larger than the threshold value SA0 as a result of the comparison, it is determined that there is no portion similar to the coding target block CB in a predetermined area in the search frame. Therefore, without narrowing down the search range, the large search range W of 46 pixels by 46 pixels is set as the search range for the motion vector detection (step S23). Specifically, in this case, both the search H pixel width and the search V pixel width are defined as "46" and the offset is defined as (0, 0).

When the minimum value SAmin is not larger than the threshold value SA0, it is determined that there is a portion similar to the coding target block CB in the predetermined area in the search frame. Therefore, the small search range S of 30 pixels by 30 pixels is set as the search range for the motion vector detection (step S24). Then, in a step S25, the offset is set so that the search range S can be set in the position of a block SBk when the absolute value of a difference between the accumulation result of the block SBk and the accumulation result of the coding target block CB is the minimum.

For example, in the case where the block SB0 is set in the same position as the coding target block CB and the blocks SB1 through SB8 are set around the block SB0, the offset is set at (0, 0) when the absolute value of a difference between the accumulation result of the block SB0 and the accumulation result of the coding target block CB is the minimum. Also, when the absolute value of a difference between the accumulation result of the block SB8 and the accumulation result of the coding target block CB is the minimum, the offset is set at (16, 16).

In this manner, according to this embodiment, the offset is set without using a motion vector detected in a previous frame. Therefore, the offset can be set in an initial frame in the motion vector detection. As a result, a motion vector can be detected more efficiently than in the first embodiment.

Alternatively, with defining a part of the coding target block as a unit area and with setting plural comparison areas each having the same size as the unit area, a predetermined pixel calculation can be executed on each of these areas. Also, the unit area can include an area in the vicinity of the coding target block. Moreover, the unit area can be in any shape.

As the predetermined pixel calculation, for example, an accumulating calculation of a difference between adjacent pixels, a variance calculation of pixels or a frequency distribution calculation of pixels can be adopted in stead of the accumulating calculation. In addition, a calculation result can be provided with a weighting in accordance with the position of the area.

It is noted that the present invention is easily applicable to motion vector detection in accordance with rotation or enlargement/reduction of an image.

What is claimed is:

1. A motion vector detecting device comprising:

motion vector detecting means for calculating a correlation evaluation value indicating correlation between a coding target block in a target frame and a candidate block within a search range of a search frame and for detecting a motion vector with regard to said coding target block on the basis of said correlation evaluation values;

original search range storing means for storing pixel data of an original search range and for supplying pixel data read in accordance with a given memory address to said motion vector detecting means;

control means for generating, a first search width that is a pixel width in the horizontal direction of said search range, a second search width that is a pixel width in the vertical direction of said search range and an offset value indicating a relative position of said search range to said original search range; and address generating means for generating said memory address supplied to said original search range storing means on the basis of said first and second search widths and said offset value generated by said control means, wherein said address generating means includes:
a first counter for counting a clock;
a comparator for comparing said first search width with a count value of said first counter and, when said first search width accords with the count value, resetting the count value of said first counter and outputting a count-up signal;
a second counter for counting said count-up signal; and
a memory address convertor for generating said memory address supplied to said original search range storing means in accordance with a predetermined formula on the basis of said offset value and the count values of said first and second counters.

2. The motion vector detecting device of claim 1, wherein said motion vector detecting means supplies, to said control means, a detected motion vector and a correlation evaluation value corresponding to said motion vector, and said control means generates said first and second search widths and said offset value on the basis of said motion vector and said correlation evaluation value supplied by said motion vector detecting means.

3. The motion vector detecting device of claim 2, wherein said control means defines a block in the same position as or in the vicinity of said coding target block in a frame previous to said target frame as a range setting reference block, and sets a size of said search range on the basis of a correlation evaluation value corresponding to said range setting reference block.

4. The motion vector detecting device of claim 2, wherein said control means defines a block in the same position as or in the vicinity of said coding target block in a frame previous to said target frame as a range setting reference block, and sets a position of said search range on the basis of a motion vector with regard to said range setting reference block.

5. The motion vector detecting device of claim 2, wherein said control means defines a block in the same position as or in the vicinity of said coding target block in a frame previous to said target frame as a range setting reference block, and sets said original search range as said search range when correlation indicated by a correlation evaluation value corresponding to said range setting reference block is comparatively small, while sets a size of said search range to be smaller than a size of said original search range and sets a position of said search range on the basis of a motion vector with regard to said range setting reference block when correlation indicated by the correlation evaluation value of said range setting reference block is comparatively large.

6. The motion vector detecting device of claim 1, wherein said offset value corresponds to components of a vector starting at a search start point of said original search range and ending at a search start point of said search range.

7. A motion vector detecting device comprising:

motion vector detecting means for calculating a correlation evaluation value indicating correlation between a coding target block in a target frame and a candidate block within a search range of a search frame and for detecting a motion vector with regard to said coding target block on the basis of said correlation evaluation values;

original search range storing means for storing pixel data of an original search range and for supplying pixel data read in accordance with a given memory address to said motion vector detecting means;

control means for generating, a first search width that is a pixel width in the horizontal direction of said search range, a second search width that is a pixel width in the vertical direction of said search range and an offset value indicating a relative position of said search range to said original search range; and address generating means for generating said memory address supplied to said original search range storing means on the basis of said first and second search widths and said offset value generated by said control means, wherein said control means generates, in addition to said first and second search widths and said offset value, a first subsample number corresponding to a subsampling rate in the horizontal direction of said search range and a second subsample number corresponding to a subsampling rate in the vertical direction of said search range, and said address generating means generates said memory address supplied to said original search range storing means on the basis of said first and second search widths, said first and second subsample numbers and said offset value generated by said control means.

* * * * *